United States Patent [19]

Sarkoezi

[11] Patent Number: 4,972,443
[45] Date of Patent: Nov. 20, 1990

[54] METHOD AND ARRANGEMENT FOR GENERATING A CORRECTION SIGNAL FOR A DIGITAL CLOCK RECOVERY MEANS

[75] Inventor: Imre Sarkoezi, Munich, Fed. Rep. of Germany

[73] Assignee: Siemens Aktiengesellschaft, Berlin, Munich, both of Fed. Rep. of Germany

[21] Appl. No.: 265,097

[22] Filed: Oct. 31, 1988

[30] Foreign Application Priority Data

Nov. 24, 1987 [DE] Fed. Rep. of Germany ....... 3739834
Feb. 19, 1988 [DE] Fed. Rep. of Germany ....... 3805259

[51] Int. Cl.$^5$ .............................................. H04L 7/02
[52] U.S. Cl. ..................................... 375/110; 375/119
[58] Field of Search ............... 375/106, 118, 119, 120, 375/82, 87, 110, 111; 328/63, 109; 331/45, 49, 55, 1 R; 329/50

[56] References Cited

U.S. PATENT DOCUMENTS

| | | | |
|---|---|---|---|
| 4,348,762 | 9/1982 | Shiun et al. | 375/118 |
| 4,584,695 | 4/1986 | Wong et al. | 375/120 |
| 4,715,050 | 12/1987 | Tanaka et al. | 375/120 |
| 4,780,889 | 10/1988 | Ley et al. | 375/119 |
| 4,841,548 | 6/1989 | Volejnik | 375/119 |

FOREIGN PATENT DOCUMENTS 0313953 10/1988 European Pat. Off. .

Primary Examiner—Douglas W. Olms
Assistant Examiner—Marianne Huseman
Attorney, Agent, or Firm—Hill, Van Santen, Steadman and Simpson

[57] ABSTRACT

A method and arrangement for generating a correction signal for a digital clock recovery circuit. This method cost effectively provides phase sensors that can be realized in integrated technology. In a sample-and-hold circuit, an auxiliary data clock (DHT1) that is valid as a recovered clock of a digital signal (DS1) and whose clock frequency is somewhat higher or lower than the bit rate of this digital signal (DS1) is sampled by the latter. Then a trailing edge of a pulse of this auxiliary data clock (DHT1) is identified by a status change. The sample-and-hold circuit then outputs a correction request signal (K1) that releases a correction signal (K) in a following circuit, this correction signal (K) being synchronous with the auxiliary data clock (DHT1). This method is utilized in digital clock recovery equipment.

15 Claims, 4 Drawing Sheets

METHOD AND ARRANGEMENT FOR GENERATING A CORRECTION SIGNAL FOR A DIGITAL CLOCK RECOVERY MEANS

BACKGROUND OF THE INVENTION

The present invention is directed to a method and apparatus for generating a correction signal in a digital clock recovery means upon attainment of a defined phase spacing between a digital signal and a first auxiliary data clock. The data clock represents a selection of one of a plurality of auxiliary clocks that changes with the phase spacing. The auxiliary clocks have the same frequency that is slightly higher or lower than the bit rate of the digital signal and have identical phase spacing relative to one another.

This method is related to two methods disclosed in U.S. Pat. No. 4,841,548 and German Patent Application No. P 37 36 351.4. In U.S. Pat. No. 4,841,548, a phase sensor emits a correction signal when the edge of the auxiliary data clock comes closer to an edge of the digital signal by less than a defined time spacing. A delay means is required for this purpose. In the second reference (German Patent Application No. P 37 36 351.4), the correction signal results when the effective edges of the digital signal and of a special clock that is likewise derived from an auxiliary clock coincide, this special clock having the same frequency as the auxiliary data clock and being phase-shifted by a defined value relative thereto.

SUMMARY OF THE INVENTION

An object of the present invention is to provide a method and apparatus of the type set forth above that can be realized without a delay means and also without a special clock and is thus implementable in integrated circuit technology for bit rates that are equal to or higher than 34 Mbit/s.

Proceeding from a method of the type initially described, this object is achieved in that the auxiliary data clock is sampled with the leading edge of the pulses of the digital signal until an edge of a selected edge type of the auxiliary data clock is identified by a status change in the samples. The correction signal is then released. Edge types are either leading or trailing edges.

It is advantageous for the sampling to be blocked for the duration of the correction signal.

It is also advantageous for a symmetrical pulse to be selected as a first auxiliary data clock and for an edge type at whose edges the defined phase spacing is 0.5 UI (Unit Interval) to be selected for the identification. The term UI (Unit Interval) is defined in the CCITT Red Book, Volume III, Fascicle III.3, Digital Networks, Transmission Systems and Multiplexing Equipment, Geneva 1985, as a nominal difference in time between consecutive significant instants of an isochronous signal.

A defined phase spacing or the defined chronological spacing is used as a reference whereby the measured phase or chronological spacing between the effective edges of the auxiliary data clock and the leading edges of the pulses of the digital signal changes constantly in a defined range. When the measured spacing reaches the reference the correction signal is released.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
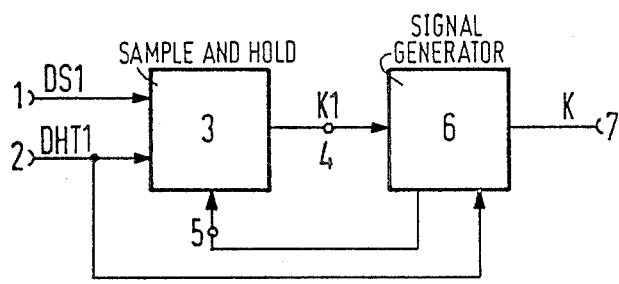
FIG. 1 is a block circuit diagram of the inventive phase sensor for a binary digital signal.
Figure 2:
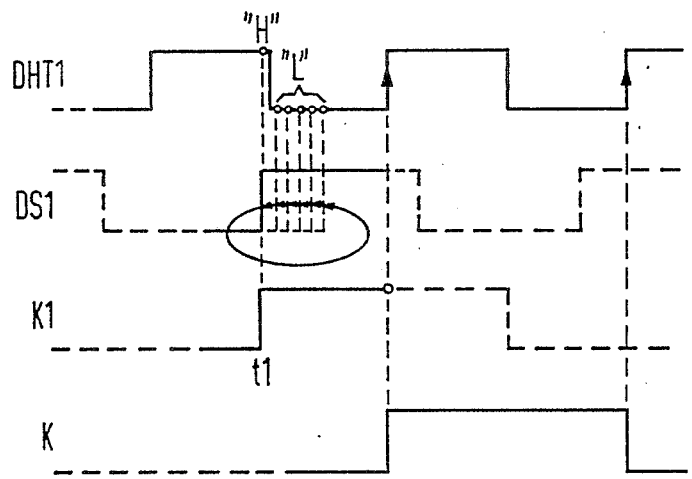
FIG. 2 is a pulse diagram for explaining the function of the phase sensor of FIG. 1.

FIG. 1 shows an inventive phase sensor which receives a binary digital signal DS1 and that has a sample-and-hold circuit 3 and a means 6 for generating the correction signal K. FIG. 2 shows the respective pulses for the signals in the FIG. 1 sensor.

Depending on the operational sign of the frequency deviation of the digital signal DS1 from the auxiliary data clock DHT1 at the input 2 from clock period to clock period, the leading edges of the digital signal DS1 at the input 1 are either only on the left or only on the right of the trailing edges or the auxiliary date clock DHT1. In FIG. 2, they are located on the right, as indicated with broken lines, until the momentary phase relation shown with a solid line is reached. The auxiliary data clock DHT1 is sampled with the leading edge of the pulses of the digital signal DS1. The trailing edge of the auxiliary data clock DHT1 is recognized by interpreting the samples. Upon recognition of the status change of the samples at time t1, a correction request signal K1 is generated at the terminal 4. The favorable phase spacing of 0.5 UI between the leading edges of the auxiliary data clock DHT1 and the leading edge of the digital signal DSI results from the, spacing between the trailing edge and the leading edge in a period of the auxiliary data clock DHT1. The symmetry of the auxiliary data clock DHT1 must be high for the required precision. This can be realized independently of the tolerances and to a great degree for a circuit integration. The correction signal K at the output 7 is generated in the means 6 which is synchronized to the auxiliary data clock DHT1.

In contrast to the second related method this is achieved without a special clock being derived from the auxiliary clock.

Figure 3:
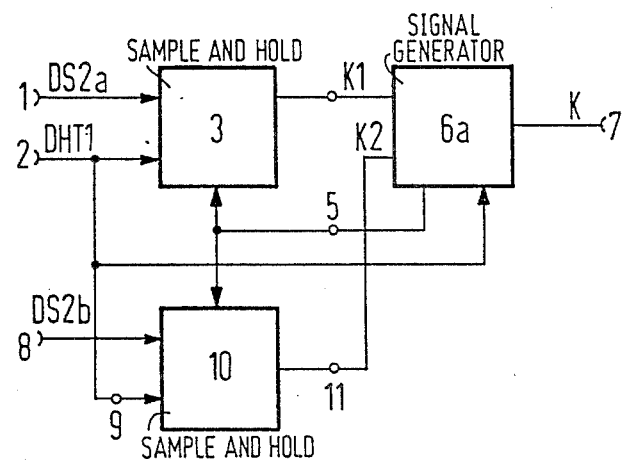
FIG. 3 is a block circuit digram of the inventive phase sensor for a bipolar digital signal.

FIG. 3 shows a phase sensor of the present invention for a bipolar digital signal having the half-waves DS2a and DS2b. The first half-wave DS2a is supplied to the sample-and-hold circuit 3. A second sample-and-hold circuit 10 receives the second half-wave DS2b. The means 6a for generating the correction signal K has two inputs for the correction request signals K1 and K2 from the two sample-and-hold circuits 3 and 10. It executes an OR operation on the two correction request signals K1 and K2.

Figure 4:
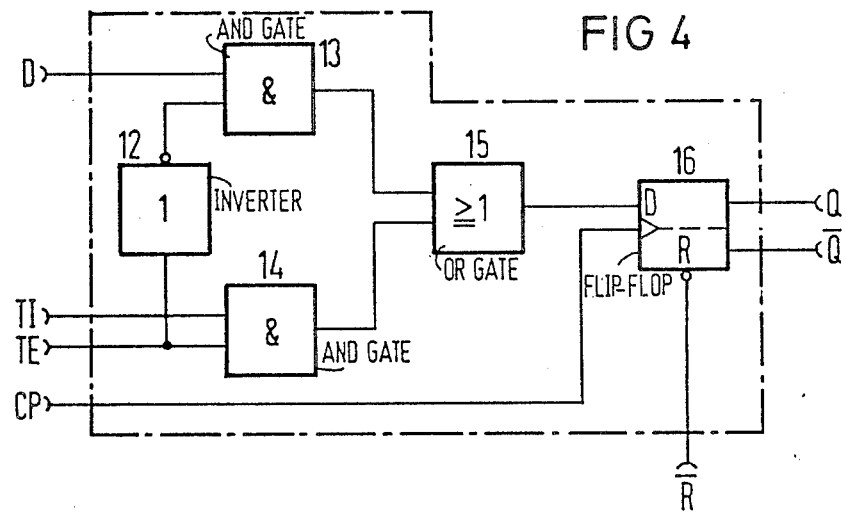
FIG. 4 is the block circuit diagram of commercially available D-flipflop having test inputs.

FIG. 4 shows the block circuit diagram of a commercially available D-flipflop having test inputs. In addition to the D-flipflop 16, it contains an inverter 12, AND gates 13 and 14 and an OR gate 15.

A test input TI and a test enable input TE are provided in addition to a D-input, a clock input CP, a reset input $\overline{R}$ and a Q output and a $\overline{Q}$ output.

Figure 5:
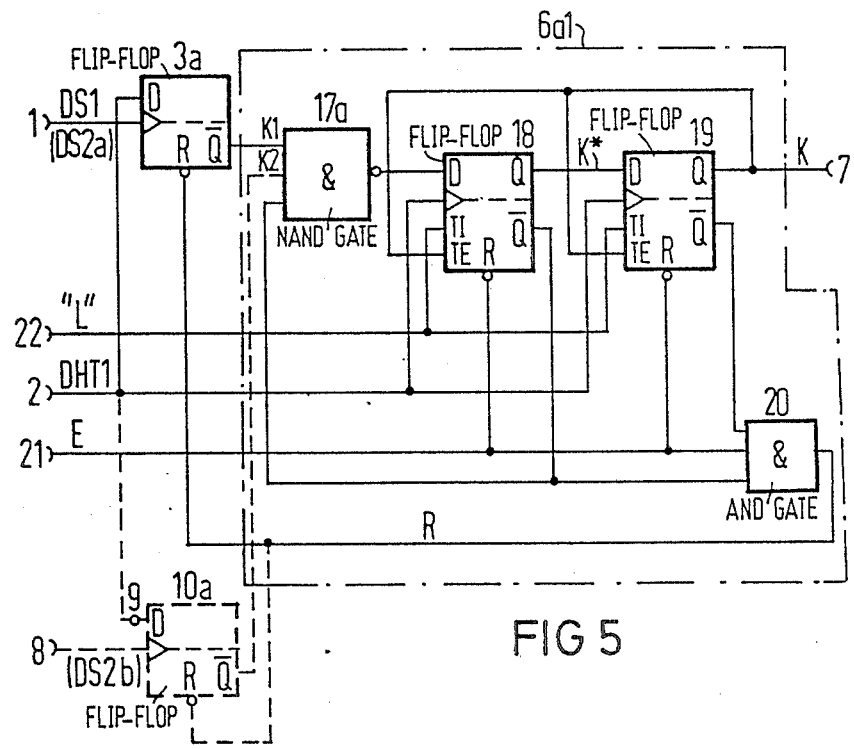
FIG. 5 is a first phase sensor of the invention in detail.

FIG. 5 shows details of a phase sensor of the present invention that is utilizable in a clock recovery means that operates with negative frequency deviation. The circuit part shown with the solid lines is required for a binary digital signal DS1. For a bipolar digital signal DS2a, DS2b, the circuit part shown with the broken lines is additionally used. The arrangement is composed of sample-and-hold circuits with simple D-flipflops 3a and 10a and of a means 6a1 for generating the correction signal K. The latter contains a first stage having NAND gate 17a and a D-flipflop with test inputs 18, a second stage having a D-flipflop with test inputs 19, and a reset stage having an AND gate 20.

The phase sensor realized with digital, integrated D-flipflop cells works under specific conditions. For the reliable switching of a D-flipflop, it must be assured that the signal at the D-input is not subject to any status change during clocking. Otherwise, unstable switching events could arise, whereby the initial condition of the D-flipflop is then undefinable. A metastable condition would arise. Since, however, the phase sensor serves for the recognition of a change in the auxiliary data clock DHT1, the probability of the occurrence of unstable switching events is thus relatively high. This means that the correction request signal K1 can often become unstable. However, metastable conditions can be suppressed by a multi-stage sampling of the correction request signal K1. This is realized in two stages by means of the D-flipflops 18 and 19 for the synchronous generation of the correction signal K. Both the generating of the correction signal K as well as the resetting are synchronized to the auxiliary data clock DHT1.

Figure 6:
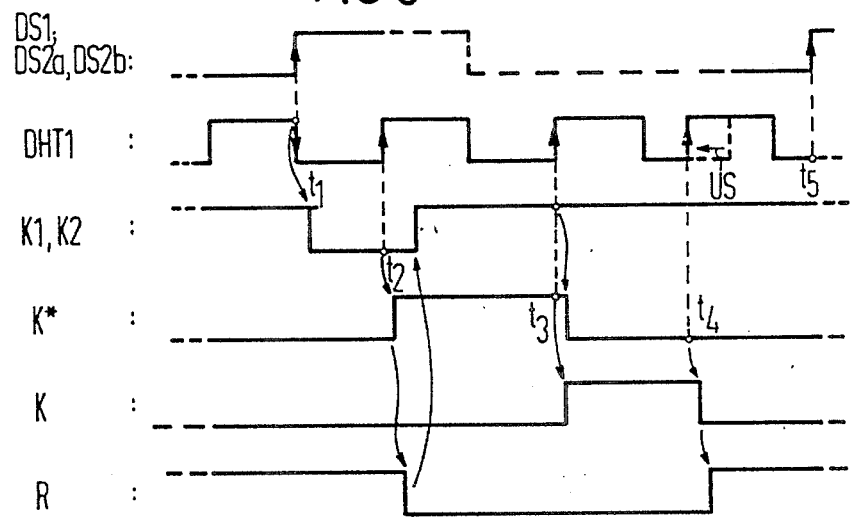
FIG. 6 is a pulse diagram for explaining said first phase sensor.

The functioning of this phase sensor is set forth below with reference to the pulse diagram in FIG. 6. The setting signal E at the input 21 having the status of a logical low sets all D-flipflops 3a, 10a, 18 and 19 to their initial condition. The Q outputs of the D-flipflops 18 and 19 as well as the output of the AND gate 20 has the status of logical low. In response thereto, the $\overline{Q}$ outputs of the D-flipflops 3a and 10a assume the status of logical high and, finally, the output of the NAND gate 17a has the status of a logical low. Via the feedback from the Q output of the D-flipflop 19 to the TE inputs of the D-flipflops 18 and 19, the latter are switched to the D-mode. This status remains unmodified as long as the samples have the status of a logical low. This corresponds to a status of a logical high at the $\overline{Q}$ output of the D-flipflop 3a . When, by contrast, the sample has the status of a logical high ($t_1$) and, accordingly, the $\overline{Q}$ output has the status of a logical low, then this denotes a correction request signal K1. With the leading edge of the auxiliarY data clock DHT1 being present this is read into the D-flipflop 18 as pre-correction signal K* at point in time $t_2$, being read in via the NAND gate 17a. When this read-in event has sequenced in a stable fashion, then a synchronous correction signal K is generated ($t_3$) by the D-flipflop at the Q output in the next period of the auxiliary data clock DHT1, being generated by means for providing the precorrection signal K*. Otherwise, this does not take place. The correction signal K having a logical high status simultaneously switches the D-flipflops 18 and 19 over to the test inputs TI, which were brought to the status of logical low in order to reset the correction signal K at point in time $t_4$ in the following period of the auxiliary data clock DHT1. At point in time $t_3$, the correction signal K initiates a switchover US in the auxiliary clocks, whereby the edge of the next DHT1 period is displaced forward by the switching with the phase spacing of the auxiliary clocks at point in time $t_4$ and, thus, a phase compensation is created. During the generating of the correction signal K (between the points in time $t_2$ and $t_4$), the $\overline{Q}$ outputs of the D-flipflops 18 and 19 block a further sampling via the AND gate 20. At point in time $t_5$, the phase sensor can again check the phase relation of the digital signal DS1 relative to DHT1 using the samples.

When a bipolar digital signal DS2a, DS2b is received at the inputs 1 and 8, the correction signal K can be generated both by the correction request signal K1 as well as by the correction request signal K2.

Figure 7:
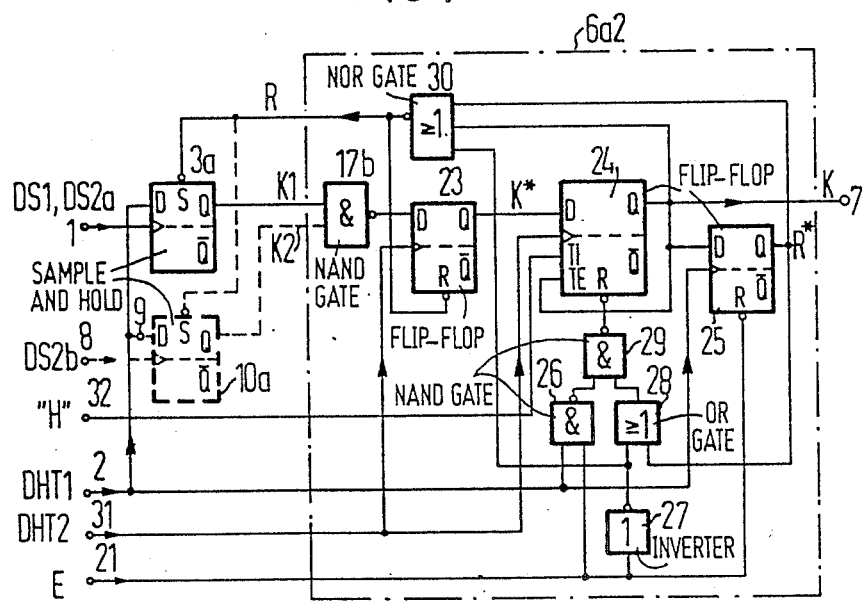
FIG. 7 is a second phase sensor of the invention in detail.

FIG. 7 shows a two-stage, "bisynchronous" phase sensor for a clock recovery means that operates with positive frequency deviation. Bisynchronous means that the correction signal K for creating an equalization of transit time for the switchings is generated synchronously relative to a second, derived auxiliary data clock DHT2, whereby the sample-and-hold circuits 3a and 10a and the reset stage 26 through 30 connected thereto continue to run synchronously with the auxiliary data clock DHT1.

Figure 8:
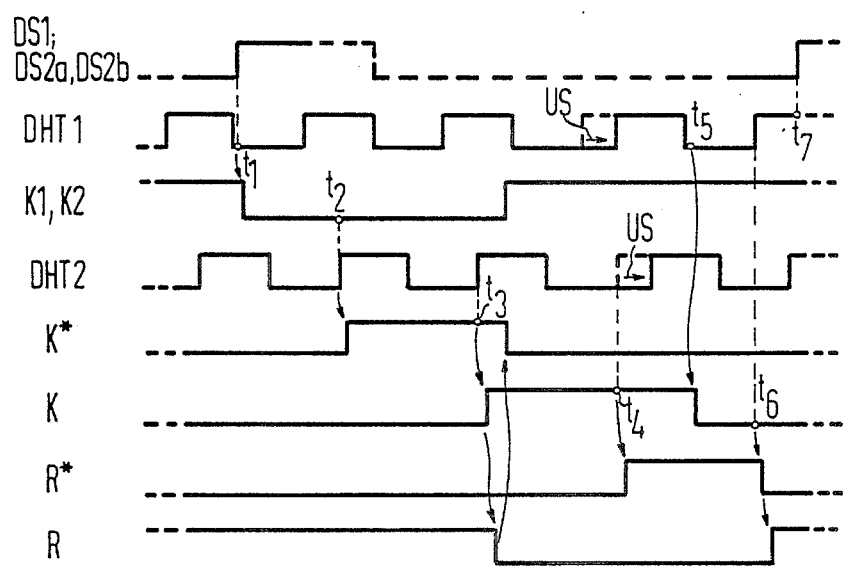
FIG. 8 is a pulse diagram for explaining this second phase sensor.

As a sample-and-hold circuit, the circuit contains a D-flipflop 3a and additionally contains a D-flipflop 10a for processing bipolar digital signals. The rest of the circuit is a means 6a2 for generating the correction signal K. This means 6a2 contains a first stage having an NAND gate 17b and a D-flipflop 23, a second stage having a D-flipflop 24 with test inputs and a reset stage having an inverter 27, NAND gates 26 and 29, an OR gate 28, a NOR gate 30 and a D-flipflop 25. The functioning of this arrangement is depicted in the pulse diagram in FIG. 8.

With its status of a logical low, the setting signal E places the means 6a2 into its initial condition in that all D-flipflops 3a, 23, 24 and 25 are reset, either directly or via the gates. The binary digital signal DS1 is supplied to the digital signal input 1 and the auxiliary data clock DHT1 is supplied to the auxiliary data clock input 2. In the D-flipflop 3a, the auxiliary data clock DHT1 is then sampled with the digital signal DS1. When the Q output changes to a status of a logical low in the sampling, then this denotes a correction request signal K1 ($t_1$). After the resetting via the S input, the Q output changes to a status of a logical high.

When half-waves of a bipolar digital signal DS2a and DS2b are received at the digital signal inputs 1 and 8, then the D-flipflop 10a can generate a further correction request signal K2. When, in the first stage, one of the two inputs of the NAND gate 17 changes to a status of a logical low, then the D-input of the D-flipflop 23 has a status of a logical high. When this event has sequenced in a stable fashion, then this status is read into the D-flipflop 23 as pre-correction signal K* ($t^2$), being read there into with the auxiliary data clock DHT2 that has a fixed phase spacing relative to the auxiliary data clock DHT1. Under the pre-condition that a metastable event in this signal cannot cause a circuit error, this pre-correction signal K* can be beneficially used for the preparation of the switch-over. In the following period of the auxiliary data clock DHT2, this status of a logical high is also read into the D-flipflop 24 of the second stage at point in time t₃ and the correction signal K arises at the Q output thereof. This initiates the switchover US, whereby the edges of both auxiliary data clocks DHT1 and DHT2 are shifted in a backward direction with the phase spacing of the auxiliary clocks, so that this status of a logical high is also read into the D-flipflop 25 of the reset stage at point in time t₄ by the auxiliary data clock DHT1 and the Q output thereof also receives the status of a logical high as reset signal R*. Following the trailing edge of the auxiliary data clock signal DHT1 (t₅), the D-flipflop 24 is reset via the gate combination 26, 28 and 29 and via the reset input and, thus, the correction signal K is ended.

The D-flipflop 3a, 10a and 23 are reset with the reset signal R via the correction signal K and are blocked until the Q output of the D-flipflop 25 again changes to a status of a logical low with the auxiliary data clock DHT1 at point in time t₆. At point in time t₇, the phase relation of the digital signal DS1 is again checked.

With the introduction of the second auxiliary data clock DHT2, whose phase spacing relative to the auxiliary data clock DHT1 can be differently selected for adaptation of the transit times, the probability of the occurrence of metastable conditions at the precorrection signal K* can result for certain circumstances. Due to the use of a D-flipflop 24 having test inputs in the second stage, however, the influence of such conditions on the correction signal K can be avoided.

Both phase sensors are realizable in integrated HCMOS technology for bit rates ≧34 Mbit/s.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for generating a correction signal (K) in a digital clock recovery means upon attainment of a defined phase spacing between a digital signal DS1i, DS2a, DS2b and a first auxiliary data clock (DHT1) allocated thereto, the first auxiliary data clock being selected from a plurality of auxiliary clocks the selection of which changes with the phase spacing, said auxiliary clocks having the same frequency which is somewhat higher or lower than the bit rate of the digital signal and having identical phase spacing relative to one another, comprising sampling the auxiliary data clock (DHT1) with the leading edge of the pulses of the digital signal until an edge of a selected edge type of the auxiliary data clock (DHT1) is identified by a status change in the samples; and then releasing the correction signal (K).

2. The method according to claim 1, wherein the sampling is inhibited for the duration of the correction signal (K).

3. The method according to claim 1, wherein a symmetrical pulse is selected as first auxiliary data clock (DHT1); and wherein the edge type at whose edges the defined phase spacing is 0.5 UI is selected for the identification of a status change.

4. A phase sensor having an output which provides a correction signal (K) comprising a first sample-and-hold circuit having a first digital signal input and having a first auxiliary data clock input and a means for generating the correction signal (K), said means for generating having an input connected to an output of said first sample-and-hold circuit, a first D-flipflop being said first sample-and-hold circuit, a D-input of said first D-flipflop being connected to the first auxiliary data clock input and a clock input thereof being connected to the first digital signal input, a Q output thereof being the output of said first sample-and-hold circuit.

5. The phase sensor according to claim 4 wherein the first digital signal input is a binary digital signal (DS1).

6. The phase sensor according to claim 4 for use in a clock recovery means that operates with negative frequency deviation, wherein said means for generating the correction signal (K) comprises:
a first NAND gate having a first input connected to the output of the first sample-and-hold circuit;
a second D-flipflop having test inputs and having a D-input connected to an output of the first NAND gate, having a clock input connected to the first auxiliary data clock input, having a TI input connected to an input for a logical status of low, having an input connected to a setting signal input thereof and having a Q̄ output connected to a second input of the first NAND gate;
a third D-flipflop having test inputs and having a D-input connected to a Q output of the second D-flipflop having a clock input connected to the first auxiliary data clock input, having a reset input connected to the setting signal input, having a TI input connected to the input for a logical status of low and having a Q output connected to a correction signal output and to TE inputs of both the second and third D-flipflops; and
a first AND gate having a first input connected to a Q̄ output of the third D-flipflop, having a second input connected to the setting signal input, having a third input connected to a second input of the first NAND gate and having an output connected to a reset input of the first D-flipflop in the first sample-and-hold circuit.

7. The phase sensor according to claim 6, wherein a second sample-and-hold circuit having a second digital signal input and having a second auxiliary data clock input is provided; and wherein said second auxiliary data clock input is connected to the first auxiliary data clock input.

8. The phase sensor according to claim 7, wherein a seventh D-flipflop is provided as a second sample-and-hold circuit, a D-input thereof being connected to the second auxiliary data clock input, a Q̄ output thereof being connected to a third input of the first NAND gate, a clock input thereof being connected to the second digital signal input and a reset input thereof being connected to the output of the AND gate.

9. The phase sensor according to claim 7, wherein the first digital signal input receives a first half-wave signal (DS2a) of a bipolar digital signal and the second digital signal input receives a second half-wave signal (DS2b) of the bipolar digital signal.

10. The phase sensor according to claim 4 for use in a clock recovery means that operates with positive frequency deviation, wherein said means for generating the correction signal (K) comprising:
a second NAND gate having a first input connected to the output of the first sample-and-hold circuit;
a fourth D-flipflop having a D-input connected to an output of the second NAND gate, having a clock input connected to an input for a second auxiliary data clock that has a fixed phase spacing relative to the first auxiliary data clock and having a reset input connected to a setting input of the first D-flipflop;

a fifth D-flipflop having test inputs and having a D input connected to a Q output of the fourth D-flipflop, having a clock input connected to the input for the second auxiliary data clock, having a Q output connected to the correction signal output, and having a test input connected to an input for a logical status high;

a sixth D-flipflop having a D input connected to the Q output and to a test enable input of the fifth D-flipflop and having a reset input connected to a setting signal input;

a third NAND gate having a first input connected to the first auxiliary data clock input and having a second input connected to the setting signal input;

an inverter having a first input connected to an output of the inverter and having a second input connected to a Q output of the sixth D-flipflop;

a fourth NAND gate having a first input connected to an output of the third NAND gate, having a second input connected to an output of the OR gate and having an output connected to a reset input of the fifth D-flipflop; and an NOR gate having a first input connected to the Q output of the sixth D-flipflop having a second input connected to a Q output of the fifth D-flipflop, having a third input connected to the output of the inverter and having an output connected to the setting input of the first D-flipflop and to a reset input of the fourth D-flipflop

11. The phase sensor according to claim 10, wherein a second sample-and-hold circuit having a second digital signal input and having a second auxiliary data clock input is provided; and wherein said second auxiliary data clock input is connected to the first auxiliary data clock input.

12. The phase sensor according to claim 11, wherein an eighth D-flipflop is provided as a second sample-and-hold circuit, a D-input thereof being connected to the second auxiliary data clock input, a Q output thereof being connected to a second input of the second NAND gate, a clock input thereof being connected to the digital signal input and a setting input thereof being connected to the output of the NOR gate.

13. The phase sensor according to claim 11, wherein the first digital signal input receives a first half-wave signal (DS2a) of a bipolar digital signal and the second digital signal input receives a second half-wave signal (DS2b) of the bipolar digital signal.

14. The phase sensor according to claim 4, wherein a second sample-and-hold circuit having a second digital signal input and having a second auxiliary data clock input is provided; and wherein said second auxiliary data clock input is connected to the first auxiliary data clock input.

15. The phase sensor according to claim 14, wherein the first digital signal input receives a first half-wave signal (DS2a) of a bipolar digital signal and the second digital signal input receives a second half-wave signal (DS2b) of the bipolar digital signal.

* * * * *